US007442740B2

(12) United States Patent
Patel et al.

(10) Patent No.: US 7,442,740 B2
(45) Date of Patent: Oct. 28, 2008

(54) HYBRID TONER PROCESSES

(75) Inventors: Raj D Patel, Oakville (CA); Guerino G Sacripante, Oakville (CA); Edward G Zwartz, Mississauga (CA); Enno E Agur, Toronto (CA); Allan K Chen, Oakville (CA); T. Hwee Ng, Mississauga (CA); Kimberly D Nosella, Mississauga (CA); Cuong Vong, Hamilton (CA); Karen A Moffat, Brantford (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/099,430

(22) Filed: Apr. 8, 2008

(65) Prior Publication Data

US 2008/0187855 A1 Aug. 7, 2008

Related U.S. Application Data

(62) Division of application No. 11/044,847, filed on Jan. 27, 2005, now Pat. No. 7,358,021.

(51) Int. Cl.
*C08J 3/02* (2006.01)
*G03G 5/00* (2006.01)
*C08K 3/20* (2006.01)

(52) U.S. Cl. ....................... 524/501; 524/513; 524/443; 524/444; 524/456; 430/137.14

(58) Field of Classification Search ............ 430/137.14; 524/501, 513, 443, 444, 456
See application file for complete search history.

(56) References Cited

U.S. PATENT DOCUMENTS

| | | | |
|---|---|---|---|
| 5,994,020 | A | 11/1999 | Patel et al. |
| 6,132,924 | A | 10/2000 | Patel et al. |
| 6,268,102 | B1 | 7/2001 | Hopper et al. |
| 6,395,442 | B1 | 5/2002 | Hayashi et al. |
| 6,416,920 | B1 | 7/2002 | Hopper et al. |
| 6,472,117 | B1 | 10/2002 | Kohyama et al. |
| 6,495,302 | B1 | 12/2002 | Jiang et al. |
| 6,500,597 | B1 | 12/2002 | Patel et al. |
| 6,541,175 | B1 | 4/2003 | Jiang et al. |
| 6,576,389 | B2 | 6/2003 | Vanbesien et al. |
| 6,602,644 | B2 | 8/2003 | Matsushima et al. |
| 6,617,091 | B2 | 9/2003 | Nishimori et al. |
| 6,677,097 | B2 | 1/2004 | Ohmura et al. |
| 6,767,684 | B1 | 7/2004 | Patel et al. |
| 6,942,954 | B2 | 9/2005 | Patel et al. |
| 6,984,480 | B2 | 1/2006 | VanBesien et al. |
| 7,037,633 | B2 | 5/2006 | Hopper et al. |
| 7,214,463 | B2 | 5/2007 | Patel et al. |

*Primary Examiner*—Mark A Chapman
(74) *Attorney, Agent, or Firm*—E. O. Palazzo

(57) ABSTRACT

A toner process that includes a first heating of a colorant dispersion, a first polyester resin free latex emulsion, a second polyester latex emulsion, and a wax dispersion in the presence of a coagulant containing a metal ion; adding a third polyester free latex; adding an organic sequestering compound or a silicate salt sequestering compound, followed by a second heating.

16 Claims, No Drawings

HYBRID TONER PROCESSES

This is a divisional of U.S. application Ser. No. 11/044,847, filed Jan. 27, 2005 by the same inventors, now U.S Pat. No. 7,358,021, and claims priority therefrom. This divisional application is being filed in response to a restriction requirement in that prior application

CROSS-REFERENCE TO RELATED APPLICATIONS AND PATENTS

Illustrated in application U.S. Ser. No. 10/606,330, filed Jun. 25, 2003, entitled Toner Processes, now U.S. Pat. No. 6,942,954, the disclosure of which is totally incorporated herein by reference, is a toner process comprised of heating a mixture of an acicular magnetite dispersion, a colorant dispersion, a wax dispersion, a first latex containing a crosslinked resin, and a second latex containing a resin free of crosslinking in the presence of a coagulant to provide aggregates, stabilizing the aggregates with a silicate salt dissolved in a base, and further heating the aggregates to provide coalesced toner particles.

Illustrated in application U.S. Ser. No. 10/606,298, filed Jun. 25, 2003, entitled Toner Processes, now U.S. Pat. No. 7,037,633, the disclosure of which is totally incorporated herein by reference, is a toner process comprised of a first heating of a mixture of an aqueous colorant dispersion, an aqueous latex emulsion, and an aqueous wax dispersion in the presence of a coagulant to provide aggregates, adding a base followed by adding an organic sequestering agent, and thereafter accomplishing a second heating, and wherein the first heating is below about the latex polymer glass transition temperature (Tg), and the second heating is about above the latex polymer glass transition temperature.

Illustrated in application U.S. Ser. No. 10/603,449, filed Jun. 25, 2003, entitled Toner Processes, now U.S. Pat. No. 6,984,480, the disclosure of which is totally incorporated herein by reference, is a toner process comprised of a first heating of a colorant dispersion, a latex emulsion, and a wax dispersion in the presence of a coagulant containing a metal ion; adding a silicate salt; followed by a second heating.

Illustrated in U.S. Pat. No. 6,576,389, filed Oct. 15, 2001 on Toner Coagulant Processes, the disclosure of which is totally incorporated herein by reference, is a process for the preparation of toner comprising mixing a colorant dispersion, a latex emulsion, a wax dispersion and coagulants comprising a colloidal alumina coated silica, and a polymetal halide.

The appropriate components, such as for example, waxes, coagulants, resin latexes, surfactants, and colorants, and processes of the above copending applications may be selected for the present invention in embodiments thereof.

BACKGROUND

Illustrated herein in embodiments are toner processes, and more specifically, aggregation and coalescence processes. Yet, more specifically, disclosed in embodiments are methods for the preparation of toner compositions by a chemical process, such as emulsion aggregation, wherein latex particles, such as latexes containing vinyl polymeric particles, are aggregated with a polyester, such as a crystalline polyester (CPE), a wax and colorants, in the presence of a coagulant like a polymetal halide, adding a latex containing vinyl polymeric particles, thereafter stabilizing the aggregates with a solution of an alkali sequestering compound, such as alkali metal silicate like sodium silicate, or an organic compound, such as ethylenediaminetetraacetic acid (EDTA), dissolved in a base, such as sodium hydroxide, and thereafter coalescing or fusing by heating the mixture above the resin Tg to provide toner size particles.

A number of advantages are associated with the toner obtained by the processes illustrated herein including, for example, excellent gloss characteristics, such as about 55 to about 70 ggu, and the substantial removal of metal ions, such as aluminum originating with the coagulant; excellent hot toner offset, for example about 210° C., and a fusing latitude of from about 30° C. to about 45° C. wherein fusing latitude refers, for example, to a temperature in which, when a developed image is fused, evidences substantially no offset either to the substrate that the image is fused on, referred to as "Cold" offset or offset on the fuser roll referred as the "HOT" offset; a suitable toner minimum fixing temperature (MFT), thereby extending photoreceptor life since the toner fusing temperature can be below about 200° C., such as from about 160° C. to about 180° C.

REFERENCES

In U.S. Pat. No. 6,677,097, the disclosure of which is totally incorporated herein by reference, there is illustrated a toner for developing a static image comprising at least a resin, colorant and crystalline substance. The toner particle has a domain-matrix structure and the domain has an average of the ratio of the major axis to the minor axis of from 1.5 to 2.5 when the domain is approximated by an ellipse.

In U.S. Pat. No. 6,602,644, the disclosure of which is totally incorporated herein by reference, there is illustrated a toner for developing an electrostatic latent image. The toner comprises a resin, a colorant and a releasing agent or a crystalline polyester compound, and the toner has crushability index from 0.1 to 0.8. The toner is preferably produced by sat-out/fusion-adherence of a composite resin particle and a colorant particle, the composite resin particle comprises polyester compound in a portion of the composite resin particle other than outermost layer.

In U.S. Pat. No. 6,617,091, the disclosure of which is totally incorporated herein by reference, there is illustrated a method of preparing toner for developing an electrostatic image. The method comprises process for adhering by fusing resin particles onto surface of colored particles (core particles) containing a resin particle and a colorant by salting-out/fusion-adhering to form the resin layer (shell).

In U.S. Pat. No. 6,472,117, the disclosure of which is totally incorporated herein by reference, there is illustrated a toner for developing an electrostatic image comprising a resin, a colorant and a releasing agent in which the toner particles are obtained by salting out/fusion-adhering a resin particle comprising a binding resin and a releasing agent together with a colorant particle. The toner comprises the toner particles having a variation coefficient of the number particle size distribution of not more than 27 percent.

In U.S. Pat. No. 6,395,442, the disclosure of which is totally incorporated herein by reference, there is illustrated a toner for electrophotography. The resin binder is obtained by fusing fine resin particles comprising a crystalline material and amorphous polymer in a water-based medium. The crystalline material preferably has a melting point of 60 to 130° C., a number average molecular weight of 1,500 to 15,000, and a melt viscosity at the melting point +20° C. of not more than 100 Pa·s, and the amorphous polymer is preferably composed of a radically polymerizable monomer.

In U.S. Pat. No. 6,268,102, the disclosure of which is totally incorporated herein by reference, there is illustrated a process for the preparation of toner comprising mixing a colorant a latex, and a coagulant, followed by aggregation and coalescence, wherein the coagulant may be a polyaluminum sulfosilicate.

In U.S. Pat. No. 6,132,924, the disclosure of which is totally incorporated herein by reference, there is illustrated a process for the preparation of toner comprising mixing a colorant, a latex, and two coagulants, followed by aggregation and coalescence, and wherein one of the coagulants may be polyaluminum chloride.

Illustrated in U.S. Pat. No. 5,994,020, the disclosure of which is totally incorporated herein by reference, are toner preparation processes, and more specifically, a process for the preparation of toner comprising:

(i) preparing, or providing a colorant dispersion;

(ii) preparing, or providing a functionalized wax dispersion comprised of a functionalized wax contained in a dispersant mixture comprised of a nonionic surfactant, an ionic surfactant, or mixtures thereof;

(iii) shearing the resulting mixture of the functionalized wax dispersion (ii) and the colorant dispersion (i) with a latex or emulsion blend comprised of resin contained in a mixture of an anionic surfactant and a nonionic surfactant;

(iv) heating the resulting sheared blend of (iii) below about the glass transition temperature (Tg) of the resin particles;

(v) optionally adding additional anionic surfactant to the resulting aggregated suspension of (iv) to prevent, or minimize additional particle growth of the resulting electrostatically bound toner size aggregates during coalescence (iv);

(vi) heating the resulting mixture of (v) above about the Tg of the resin; and optionally, (vii) separating the toner particles; and a process for the preparation of toner comprising blending a latex emulsion containing resin, colorant, and a polymeric additive; adding an acid to achieve a pH of about 2 to about 4 for the resulting mixture; heating at a temperature about equal to, or about below the glass transition temperature (Tg) of the latex resin; optionally adding an ionic surfactant stabilizer; heating at a temperature about equal to, or about above about the Tg of the latex resin; and optionally cooling, isolating, washing, and drying the toner.

Illustrated in U.S. Pat. No. 6,541,175, the disclosure of which is totally incorporated herein by reference, is a process comprising:

(i) providing or generating an emulsion latex comprised of sodio sulfonated polyester resin particles by heating the particles in water at a temperature of from about 65° C. to about 90° C.;

(ii) adding with shearing to the latex (i) a colorant dispersion comprising from about 20 percent to about 50 percent of a predispersed colorant in water, followed by the addition of an organic or an inorganic acid;

(iii) heating the resulting mixture at a temperature of from about 45° C. to about 65° C. followed by the addition of a water insoluble metal salt or a water insoluble metal oxide thereby releasing metal ions and permitting aggregation and coalescence, optionally resulting in toner particles of from about 2 to about 25 microns in volume average diameter; and optionally (iv) cooling the mixture and isolating the product.

Also of interest is U.S. Pat. No. 6,416,920, the disclosure of which is totally incorporated herein by reference, which illustrates a process for the preparation of toner comprising mixing a colorant, a latex, and a silica, which silica is coated with an alumina.

Illustrated in U.S. Pat. No. 6,495,302, the disclosure of which is totally incorporated herein by reference, is a process for the preparation of toner comprising (i) generating a latex emulsion of resin, water, and an ionic surfactant, and a colorant dispersion of a pigment, water, an ionic surfactant, or a nonionic surfactant, and wherein (ii) the latex emulsion is blended with the colorant dispersion;

(iii) adding to the resulting blend containing the latex and colorant a coagulant of a polyaluminum chloride with an opposite charge to that of the ionic surfactant latex colorant;

(iv) heating the resulting mixture below or equal to about the glass transition temperature (Tg) of the latex resin to form aggregates;

(v) optionally adding a second latex comprised of submicron resin particles suspended in an aqueous phase (iv) resulting in a shell or coating wherein the shell is optionally of from about 0.1 to about 1 micron in thickness, and wherein optionally the shell coating is contained on 100 percent of the aggregates;

(vi) adding an organic water soluble or water insoluble chelating component to the aggregates of (v) particles, followed by adding a base to change the resulting toner aggregate mixture from a pH which is initially from about 1.9 to about 3 to a pH of about 5 to about 9;

(vii) heating the resulting aggregate suspension of (vi) above about the Tg of the latex resin;

(viii) optionally retaining the mixture (vii) at a temperature of from about 70° C. to about 95° C.;

(ix) changing the pH of the (viii) mixture by the addition of an acid to arrive at a pH of about 1.7 to about 4; and (x) optionally isolating the toner.

Illustrated in U.S. Pat. No. 6,500,597, the disclosure of which is totally incorporated herein by reference, is a process comprising (i) blending a colorant dispersion of a pigment, water, and an anionic surfactant, or a nonionic surfactant with (ii) a latex emulsion comprised of resin, water, and an ionic surfactant;

(iii) adding to the resulting blend a first coagulant of polyaluminum sulfosilicate (PASS) and a second cationic co-coagulant having an opposite charge polarity to that of the latex surfactant;

(iv) heating the resulting mixture below about the glass transition temperature (Tg) of the latex resin;

(v) adjusting with a base the pH of the resulting toner aggregate mixture from a pH which is in the range of about 1.8 to about 3 to a pH range of about 5 to about 9;

(vi) heating above about the Tg of the latex resin;

(vii) changing the pH of the mixture by the addition of a metal salt to arrive at a pH of from about 2.8 to about 5; and (viii) optionally isolating the product.

Emulsion/aggregation/coalescing processes for the preparation of toners are illustrated in a number of Xerox patents, the disclosures of which are totally incorporated herein by reference, such as U.S. Pat. Nos. 5,290,654, 5,278,020, 5,308,734, 5,370,963, 5,344,738, 5,403,693, 5,418,108, 5,364,729, 5,346,797; and also of interest may be U.S. Pat. Nos. 5,348,832; 5,405,728; 5,366,841; 5,496,676; 5,527,658; 5,585,215; 5,650,255; 5,650,256; 5,501,935; 5,723,253; 5,744,520; 5,763,133; 5,766,818; 5,747,215; 5,827,633; 5,853,944; 5,804,349; 5,840,462; 5,869,215; 5,869,215; 5,863,698; 5,902,710; 5,910,387; 5,916,725; 5,919,595; 5,925,488 and 5,977,210. The components and processes of the Xerox patents can be selected for the present invention in embodiments thereof.

In addition, the following U.S. Patents relate to emulsion aggregation toner processes.

U.S. Pat. No. 5,922,501, the disclosure of which is totally incorporated herein by reference, illustrates a process for the preparation of toner comprising blending an aqueous colorant dispersion and a latex resin emulsion, and which latex resin is generated from a dimeric acrylic acid, an oligomer acrylic acid, or mixtures thereof and a monomer; heating the resulting mixture at a temperature about equal, or below about the glass transition temperature (Tg) of the latex resin to form aggregates; heating the resulting aggregates at a temperature about equal to, or above about the Tg of the latex resin to effect coalescence and fusing of the aggregates; and optionally isolating the toner product, washing, and drying.

U.S. Pat. No. 5,945,245, the disclosure of which is totally incorporated herein by reference, illustrates a surfactant free process for the preparation of toner comprising heating a mixture of an emulsion latex, a colorant, and an organic complexing agent.

SUMMARY

A feature illustrated herein relates to a toner process wherein there is provided toners by mixing a colorant dispersion with a first latex emulsion substantially free of a polyester, and a second latex containing a crystalline polyester, a wax dispersion, and a coagulant containing a metal ion; heating to provide toner size aggregates and adding a latex emulsion free of polyester; stabilizing with a sequestering agent like a silicate salt or optionally an organic compound thereby sequestering the metal ion and reducing crosslinking.

Further features disclosed herein include the use of a sequestering or a complexing compound, such as a silicate salt or optionally an organic compound, which salt or compound permits the extraction of metal ions, such as aluminum; and a process wherein the silica metal complex forms a precipitate of a silica-metal ion complex thereby rendering the metal ion substantially insoluble and nonreactive, thus eliminating metal ion induced crosslinking; a toner process wherein the sequestering agent is dissolved in a base and which agent functions to extract or complex with coagulant metal ions, and also acts to increase the pH of the aggregates mixture when the aggregates are heated above the resin Tg to coalesce the particles with minimal increase in particle size or distribution; a process wherein the sequestering or extraction of the metal complexing ion minimizes the ionomeric crosslinking within the polymer resin to provide in a toner with a suitable glossy finish, and a toner process wherein an aqueous solution of a silicate salt dissolved in a base generates silica particles resulting from the silicate salt.

EMBODIMENTS

Further features and aspects thereof illustrated herein include a toner process comprised of a first heating of a colorant dispersion, a first latex emulsion, a second latex emulsion, and a wax dispersion in the presence of a coagulant containing a metal ion; adding a third latex, optionally adding an organic sequestering compound or a silicate salt sequestering compound, followed by a second heating, wherein the first heating is below about the latex polymer glass transition of the first latex polymer temperature (Tg), and the second heating is about above the latex polymer glass transition temperature, and wherein the first latex and the third latex are free of a polyester and the second latex contains a polyester; a process comprising heating a mixture of colorant dispersion, a first resin latex, a second resin latex, and optionally a wax and a coagulant, and wherein the heating involves a first heating, followed by the addition of a third latex containing vinyl polymer enabling the formation of a shell, and subsequently accomplishing a second heating, and which second heating is at a higher temperature than the first heating, and wherein the second heating is above about the glass transition temperature of the first latex resin, and which process is accomplished in the presence of a coagulant, and wherein the first resin latex is free of a polyester, and the second latex resin is a crystalline polyester; a process comprising heating a mixture of colorant, a first polyester free latex, and a second crystalline polyester latex mixed with the first latex in the presence of a coagulant, and wherein the heating comprises a first heating equal to or below about the glass transition temperature of the first uncrosslinked polymer contained in the first latex, followed by the addition of a third latex free of a polyester enabling the formation of a shell, and the second heating is equal to or above the glass transition temperature of the first polymer contained in the first latex in the presence of a sequestering component, wherein the first heating enables the first and second formation of aggregates, and the second heating enables the fusion of the colorant and the first and second latex polymers; and optionally wherein there is added prior to fusion a sequestering component contained in an alkali metal hydroxide; a process wherein the crystalline polyester latex is aggregated with a styrene latex, such as a styrene acrylate carboxylic acid latex, wherein the aggregation is initiated in the presence of a colorant, a wax, and other suitable toner additives, including charge control additives, and in the presence of a coagulant to provide a hybrid toner after fusing of the aggregates in the presence of a metal sequestering agent or compound like a silicate, such as sodium silicate, or EDTA, each of which primarily function to minimize or reduce the crosslinking of the aggregate polymer components, and which hybrid toner contains a shell generated from a third latex primarily of a suitable polymer like a styrene containing polymer, such as a styrene acrylate carboxylic acid; an emulsion/aggregation/coalescence toner process as illustrated herein, and where there is generated a shell or a coating of a styrene base polymer, such as a styrene acrylate carboxylic acid latex (EA1 latex) in contact with a core generated from a blend of a crystalline polyester and a styrene based latex, such as an EA1 latex, and wherein coalescence is performed at a temperature equal to or above the glass transition temperature of the styrene based latex wherein the crystalline polyester resin is conventionally prepared by polycondensation reaction and can contain about 70 percent crystalline to about 30 percent of amorphous segments; an emulsion aggregation process wherein there is selected core blend comprised of about 80 to about 90 percent of a styrene based latex, and about 20 to about 10 percent of a crystalline polyester resin, or about 80 percent of a styrene based resin and about 20 percent of a crystalline polyester resin; toner processes wherein the aggregates can be stabilized from growing or increasing in size by the addition of or presence of a basic sequestering compound, such as ethylenediaminetetraacetic acid (ETDA), diethylenetriaminepentacetic acid; nitrilotriacetic acid, or the corresponding salts; toner processes wherein biodegradable compounds of the complexing compounds illustrated herein can be selected, such as gluconal, sodium gluconate, potassium and sodium citrate, nitrotriacetate (NTA) salt, GLDA (commercially available L-glutamic acid N,N diacetic acid) humic and fulvic acids, maltol and ethyl-maltol, peta-acetic and tetra-acetic acids; toner processes wherein examples of silicates that can be selected are sodium silicates, such as those commercially available like A®1647, A®1847, A®2445, A®2447, A®2645, BJ™ 120, BW™ 50, C™, D™, E™, K®, M®, N®, N®38, N® Clear, O®, OW®, RU™, SS® 22, SS® 75, STAR™, STARSO®, STIXSI™ RR, and V®. Potassium silicates such as KASIL® 1, KASIL® 6, KASIL® 23, all available from Philadelphia Quartz; sodium silicate Cat. #33, 844-3 available from Aldrich Chemicals; OXYCHEM GRADE 40, GRADE 42, GRADE JW-25, GRADE 47, GRADE 49F, GRADE 50, GRADE 52, GRADE WD-43, all available from Occidental Chemical Corporation, which silicates sequester or capture metal ions like the aluminum of the polymetal halide coagulant resulting in a toner comprised of a core of styrene, such as a styrene acrylate carboxylic acid and a crystalline polyester, colorant, wax, and a shell as illustrated herein, and wherein the crystalline polyester, colorant, and wax are entrapped within the resin particles; toner emulsion/aggregation/coalescence toner processes as illustrated herein wherein the crystalline polyester resin can be generated by starve fed semicontinuous emulsion polymerization, and wherein the resin resulting is incorporated or entrapped in a styrene containing resin to allow, for example, a reduction in the toner minimum fusing temperature (MFT) substantially without adversely impacting the toner charging characteristics, and wherein the core can be referred to as a stable single phase comprised of a styrene acrylate latex containing a crystalline polyester latex in an amount, for example, of from about 5 to about 50, about 10 to about 30, and more specifically, about 5 to about 25 weight percent; and wherein there can be selected as the polyester resin an alkali copoly(5-sulfo-isophthaloyl)-copoly(pentylene-adipate),

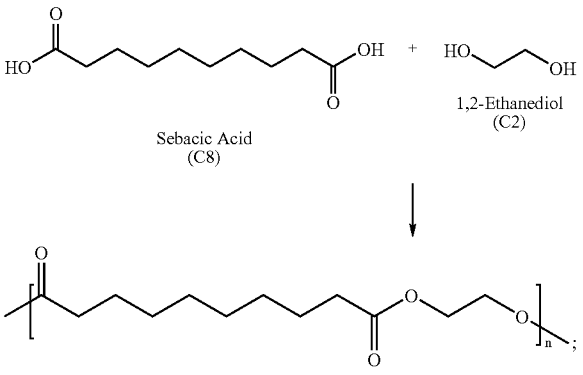

Sebacic Acid (C8)

1,2-Ethanediol (C2)

a toner process comprised of a first heating of a colorant dispersion, a polyester free latex emulsion, a crystalline polyester emulsion, and a wax dispersion in the presence of a coagulant containing a metal ion; adding a silicate salt or an organic compound, such as an ethylene diamine tetra acetic acid (EDTA) salt; adding a third latex followed by a second heating; a process comprising heating a mixture of a colorant dispersion, a first nonpolyester resin latex, a second polyester latex, followed by a coagulant, and wherein the heating involves a first heating and adding a third nonpolyester latex followed by subsequently a second heating, and which second heating is at a higher temperature than the first heating, and wherein the second heating is above about the glass transition temperature of the polyester free latex resins, and which process is accomplished in the presence of a silicate salt or an organic sequestering compound; a toner process wherein there is selected a latex comprised of a suitable polymer like a vinyl polymer, and a latex containing a crystalline polyester polymer; a process comprising heating a mixture of colorant and latex or latexes in the presence of a coagulant, and wherein the heating comprises a first heating equal to or below about the glass transition temperature of a polymer contained in the polyester free latex, and a second heating after adding a third polyester free latex, followed by the addition of a sequestering compound, which heating is equal to or above the glass transition temperature of a polymer contained in the polyester free latex; wherein the first heating enables the formation of aggregates and the second heating enables the fusion of the aggregates; and optionally wherein the sequestering compound is contained in an alkali metal hydroxide; a process wherein (i) the colorant dispersion contains colorant, water and an anionic surfactant, or a nonionic surfactant, and a wax dispersion is added comprised of submicron wax particles of from about 0.1 to about 0.5 micron in diameter by volume, and which wax is dispersed in water and an anionic surfactant to provide a mixture containing colorant and a wax;

(ii) blending a latex emulsion mixture comprised of submicron resin particles of about 150 to about 300 nanometers in diameter and containing water, an anionic surfactant or a nonionic surfactant; and which mixture contains a polymer other than a polyester and a crystalline polyester;

(iii) wherein the resulting blend possesses a pH of about 2.2 to about 2.8 to which is added a coagulant, such as a polymetal halide, to initiate flocculation or aggregation of the blend components;

(iv) heating the resulting mixture of (iii) below about the glass transition temperature (Tg) of the polyester free latex resin to form toner sized aggregates;

(v) adding to the formed toner aggregate particles a third latex comprised of a vinyl resin suspended in an aqueous phase containing an ionic of surfactant and water, and stirring for a period of time to permit stabilization of the aggregate particle size;

(vi) adding to the resulting mixture of (iv) an aqueous solution of a silicate salt dissolved in a base and followed by the addition of further base to thereby change the pH, which is initially from about 2 to about 2.8, to arrive at a pH of from about 7 to about 7.5;

(vii) heating the resulting aggregate mixture of (v) about above the Tg of the polyester free polymer;

(viii) retaining the mixture temperature at from about 85° C. to about 95° C. for an optional period of about 10 to about 60 minutes, followed by a pH reduction with an acid to arrive at a pH of about 3.8 to about 6;

(ix) retaining the mixture temperature at from about 85° C. to about 95° C. for a period of about 4 to about 6 hours to assist in permitting the fusion or coalescence of the toner aggregates and to obtain smooth particles;

(x) washing the resulting toner slurry; and (xi) isolating, and drying the toner; a toner process wherein the toner obtained when analyzed for aluminum and silica indicates that about 5 to about 50 percent of aluminum is extracted depending on the amount of sodium silicate used as the sequestering agent, for example, when the sequestering agent amount is about 0.5 to about 1.5 the amount of the metal ion sequestering, such as aluminum, is about 50 percent to about 95 percent by weight of toner; a process wherein the colorant dispersion comprises particles dispersed in water and an anionic surfactant, and which dispersion possesses a pH of about 6.3 to about 6.8; a process wherein the wax dispersion comprises particles dispersed in water and an ionic surfactant; a process wherein the toner possesses a minimum fix temperature (MFT) of about 160° C. to about 200° C.; a process wherein the toner hot offset temperature (HOT) is in excess of about 200° C.; a process wherein the colorant dispersion is present in an amount of about 4 percent to about 8 percent by weight of toner; a process wherein the polyester free latex resin particles are from about 0.15 to about 0.3 micron in volume average diameter and the crystalline polyester latex particles possess a volume average diameter of about 0.1 to about 0.3 micron; a process wherein the polyester free latex is present in an amount of from about 95 to about 70 weight percent, and the crystalline polyester latex is present in the amount of from about 5 to about 30 percent by weight of toner latex; a process wherein the colorant is of a size of about 0.01 to about 0.2 micron in average volume diameter; a process wherein the acid utilized is selected from the group consisting of nitric, sulfuric, hydrochloric, citric, acetic acid, or mixtures thereof, and the like; a process wherein the silicate is selected from the group comprised of sodium silicate, potassium silicate, or magnesium sulfate silicate; a process wherein the silicate salt dissolved in the base is added to the toner size aggregates, and which salt sequesters or extracts out the aluminum ions and eliminates aluminum induced crosslinking of the polymeric resin to provide a glossy toner; a process wherein the addition of a basic silicate salt provides a means to stabilize the toner size aggregates from further growth during coalescence when the temperature of the aggregate mixture is raised above the resin Tg; a toner process wherein in place of the silicate, such as sodium silicate, there can be selected an organic compound like EDTA; a process wherein there is added to the formed toner size aggregates a third latex optionally comprised of submicron resin particles suspended in an aqueous phase containing an anionic surfactant, and wherein the third latex is selected in an amount of from about 10 to about 40 percent by weight of the initial latex to form a shell on the formed aggregates, and which shell is of a thickness of, for example, about 0.2 to about 0.8 micron; a process wherein the pH of the mixture resulting in (vi) is increased from about 2 to about 2.6 to about 7 to about 7.4 by the addition of a sodium silicate dissolved in sodium hydroxide which functions as a stabilizer for the aggregates when the temperature of the coalescence (vi) is raised above the resin Tg; a process wherein the temperature at which toner sized aggregates are formed controls the size of the aggregates, and wherein the final toner size is from about 5 to about 12 microns in volume average diameter; a process wherein the aggregation (iv) temperature is from about 45° C. to about 65° C., and wherein the coalescence or fusion temperature of, for example, (vii) and (viii) is from about 85° C. to about 95° C.; a process wherein the time of coalescence or fusion is from about 5 to about 10 hours, and wherein there are provided toner particles with a smooth morphology; a process wherein the polyester free latexes, which usually contain a polymer free of crosslinking, contain a resin or polymer selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), and poly(alkyl acrylate-acrylonitrile-acrylic acid); a process wherein the latex contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene butyl acrylate beta carboxy ethyl acrylate (beta CEA)), poly(styrene butadiene beta CEA), poly(styrene isoprene beta CEA), poly(styrene butyl acrylate, acrylonitrile beta CEA), poly(styrene butyl acrylate, divinylbenzene beta CEA) and poly(styrene-butyl acrylate-acrylononitrile-acrylic acid);

(i) a toner process wherein there are selected two latexes, one of the latexes containing a crystalline polyester; a colorant dispersion which contains water and an anionic surfactant, and a wax dispersion comprised of submicron wax particles of from about 0.1 to about 0.5 micron in diameter by volume, and which wax is dispersed in an anionic surfactant;

(ii) wherein, more specifically, there is selected a first latex comprised of styrene based uncrosslinked resin particles, and a second latex comprised of crystalline polyester polymer particles, and wherein each of the latexes contains water and an anionic surfactant;

(iii) adding to the resulting mixture with a pH of about 2 to about 2.9 a coagulant, and which coagulant is a polymetal halide, a cationic surfactant, or mixtures thereof to primarily enable flocculation of the resin latexes, the colorant, and the wax;

(iv) heating the resulting mixture of (iii) below about the glass transition temperature (Tg) of the first latex resin to form aggregates;

(v) adding a third latex free of a polyester polymer;

(vi) adding to the resulting mixture of (v) an aqueous solution of sodium silicate or an organic sequestering agent such as EDTA dissolved in sodium hydroxide, followed by the addition of a base to thereby change the pH from an initial about 2 to about 2.9 to a pH of from about 7 to about 8;

(vii) heating the resulting aggregate suspension of (vi) to above the Tg of the first latex resin of (i);

(viii) optionally retaining the mixture temperature at from about 70° C. to about 95° C. optionally for a period of about 10 to about 80 minutes, followed by a pH reduction with an acid to arrive at a pH of about 4 to about 6 to assist in permitting the fusion or coalescence of the toner aggregates;

(ix) further retaining the mixture temperature at from about 85° C. to about 95° C. for an optional period of about 4 to about 10 hours to assist in permitting the fusion or coalescence of the toner aggregates and to obtain smooth particles; and (x) washing the resulting toner slurry, and isolating the toner; a process wherein the colorant dispersion contains a colorant, water, and nonionic surfactant wherein the colorant is present in an amount of from about 4 to about 10 weight percent; a toner process wherein the organic stabilizer is selected in an amount of from about 0.5 to about 5 percent by weight of toner; a process wherein the coagulant is comprised of a first coagulant of a polymetal halide present in an amount of about 0.02 to about 2 percent by weight of toner, and a further second cationic surfactant coagulant present in an amount of about 0.1 to about 5 percent by weight of toner; a process wherein the toner possesses a minimum fix temperature (MFT) of about 150° C. to about 200° C.; a process wherein the toner hot offset temperature (HOT) is from about 195° C. to about 210° C.; a process wherein the colorant amount is from about 3 to about 10 percent by weight of toner; a process wherein the acid is nitric, sulfuric, hydrochloric, citric or acetic acid, and the coagulant is comprised of a first coagulant of a polyaluminum chloride or a polyaluminum sulphosilicate (PASS), and optionally a second coagulant of a cationic surfactant; a process wherein the base is introduced in the form of a silicate salt or an organic complexing agent dissolved in a base selected from the group consisting of sodium hydroxide and potassium hydroxide, and wherein the second latex is selected in an amount of from about 10 to about 40 percent by weight of the initial latex (i), and wherein the third latex forms a shell thereover on the formed aggregates and on the resulting toner, and which shell is of an optional thickness of about 0.2 to about 0.8 micron, and wherein the coagulant is a polymetal halide; a process wherein the aggregation (iv) temperature is from about 45° C. to about 65° C., and wherein the coalescence or fusion temperature of (vii) and (viii) is from about 75° C. to about 95° C.; a process wherein the coagulant is a polymetal halide of polyaluminum chloride, a polyaluminum sulfosilicate, or a polyaluminum sulfate, and optionally a second cationic surfactant coagulant of an alkylbenzyl dimethyl ammonium chloride; a process wherein the wax dispersion contains a polyethylene wax, water, and an anionic surfactant, and wherein the wax is selected in an amount of from about 5 to about 20 weight percent; a process wherein the wax dispersion contains a polypropylene wax, water, and an anionic surfactant, and wherein the wax is selected in an amount of from about 5 to about 20 weight percent; a process wherein the optional second coagulant is selected from the group comprised of alkylbenzyl dimethyl ammonium chloride, dialkyl benzenealkyl ammonium chloride, lauryl trimethyl ammonium chloride, alkylbenzyl methyl ammonium chloride, alkylbenzyl dimethyl ammonium bromide, benzalkonium chloride, cetyl pyridinium bromide, and the like present in an amount of about 0.1 to about 5 percent by weight of toner; a process wherein the resin is selected in an amount of from about 40 to about 65 weight percent, the wax is selected in an amount of from about 5 to about 15 weight percent, and wherein the total thereof of the components is about 100 percent based on the toner; a process wherein the resulting toner possesses a shape factor of from about 110 to about 148; a process wherein the first or second latex resin or polymer has a glass transition temperature (Tg) of about 45° C. to about 70° C.; a process wherein the first and second resin possesses a weight average molecular weight of about 20,000 to about 90,000; a process wherein the first or second latex polymer can contain a carboxylic acid, and which carboxylic acid is, for example, selected from the group comprised of acrylic acid, methacrylic acid, itaconic acid, beta carboxy ethyl acrylate, and the like, and wherein the carboxylic acid is present in an amount of from about 0.1 to about 7 weight percent; a process comprising the heating of a colorant dispersion, a latex emulsion, and coagulants, wherein one of the coagulants is a polyaluminum chloride or bromide, and an optional second coagulant of a cationic surfactant, such as an alkylbenzyl dimethyl ammonium chloride, and wherein the mixture is aggregated by heating below the latex resin glass transition temperature, followed by the addition of silicate salt dissolved in a base, and thereafter, heating above the latex resin glass transition temperature; a toner process as illustrated herein wherein the amount of first latex resin is from about 40 to about 65 weight percent, the colorant amount is from about 4 to about 10 weight percent, and the wax amount is from about 5 to about 15 weight percent, and the total of the components is 100 percent; a process for preparing a chemical toner wherein the blending and aggregation are performed at a pH of about 2 to about 3 or about 2 to about 2.8, while the coalescence is initially conducted at a pH of about 7 to about 8 followed by a reduction in pH to about 4 to about 6, and followed by further heating for a period of hours, for example about 4 to about 6 hours; a process for preparing a toner composition by emulsion aggregation, which toner possesses a smooth shape and feel, and wherein the toner colorant possesses a size distribution of about 1.20 to about 1.26; a toner process involving the multi-stage addition of latex, for example a second portion of about 20 to about 40 percent of the total amount of latex, is retained while the remainder, a first portion, is subjected to homogenization and aggregation, thus a majority of the latex can be added at the onset while the remainder of the latex (the delayed latex) is added after the formation of the resin aggregates; and a toner process resulting in toner particles of, for example, an average volume diameter of from about 0.5 to about 25, and more specifically, from about 1 to about 10 microns, and narrow GSD characteristics of, for example, from about 1.05 to about 1.25, or from about 1.15 to about 1.25 as measured by a Coulter Counter, and an excellent shape factor, for example, of 135 or less wherein the shape factor refers, for example, to the measure of toner smoothness and toner roundness where a shape factor of about 100 is considered spherical and smooth without any surface protrusions, while a shape factor of about 150 is considered to be rough in surface morphology and the shape is like a potato.

The resin particles selected for the polyester free or substantially polyester free latex can be prepared by, for example, known emulsion polymerization methods, including semi-continuous emulsion polymerization methods, and the monomers utilized in such processes can be selected from, for example, styrene, acrylates, methacrylates, butadiene, isoprene, acrylonitrile; monomers comprised of an A and a B monomer wherein from about 72 to about 95 percent of A and from about 5 to about 28 percent of B is selected, wherein A can be, for example, styrene, and B can be, for example, an acrylate, methacrylate, butadiene, isoprene, or an acrylonitrile; and optionally, acid or basic olefinic monomers, such as acrylic acid, methacrylic acid, beta carboxy ethyl acrylate, acrylamide, methacrylamide, quaternary ammonium halide of dialkyl or trialkyl acrylamides or methacrylamide, vinylpyridine, vinylpyrrolidone, vinyl-N-methylpyridinium chloride, and the like. The presence of acid or basic groups in the monomer or polymer resin is optional, and such groups can be present in various amounts of from about 0.1 to about 10 percent by weight of the polymer resin. Chain transfer agents, such as dodecanethiol or carbon tetrabromide, can also be selected when preparing resin particles by emulsion polymerization. Other processes of obtaining resin particles of, for example, from about 0.01 micron to about 2 microns in diameter can be selected from polymer microsuspension process, such as those illustrated in U.S. Pat. No. 3,674,736, the disclosure of which is totally incorporated herein by reference; polymer solution microsuspension process, such as disclosed in U.S. Pat. No. 5,290,654, the disclosure of which is totally incorporated herein by reference; mechanical grinding process, or other known processes.

The crystalline resins, which are available from a number of sources, can be prepared by a polycondensation process by reacting an organic diol, and an organic diacid in the presence of a polycondensation catalyst. Generally, a stoichiometric equimolar ratio of organic diol and organic diacid is utilized, however, in some instances, wherein the boiling point of the organic diol is from about 180° C. to about 230° C., an excess amount of diol can be utilized and removed during the polycondensation process. The amount of catalyst utilized varies, and can be selected in an amount, for example, of from about 0.01 to about 1 mole percent of the resin. Additionally, in place of the organic diacid, an organic diester can also be selected, and where an alcohol byproduct is generated.

Examples of crystalline based polyester resins include alkali copoly(5-sulfo-isophthaloyl)-co-poly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly (pentylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly (propylene-adipate), alkali copoly(5-sulfo-isophthaloyl)-co-poly(butylene-adipate), alkali copoly(5-sulfo-isophthaloyl)-copoly(pentylene-adipate), alkali copoly(5-sulfo-isopthaloyl)-copoly(hexylene-adipate), alkali copoly(5-sulfo-isophthaloyl)-copoly(octylene-adipate), alkali copoly(5-sulfo-isophthaloyl)-copoly (ethylene-succinate), alkali copoly(5-sulfo-isophthaloyl-copoly(butylene-succinate), alkali copoly(5-sulfo-isophthaloyl)-copoly(hexylene-succinate), alkali copoly(5-sulfo-isophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly (hexylene-sebacate), alkali copoly(5-sulfo-isophthaloyl)-copoly(octylene-sebacate), alkali copoly(5-sulfo-isophthaloyl )-copoly(ethylene-adipate), alkali copoly(5-sulfo-isophthaloyl)-copoly(propylene-adipate), alkali copoly(5-sulfo-iosphthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), poly(octylene-adipate); and wherein alkali is a metal of sodium, lithium or potassium, and the like. In embodiments, the alkali metal is lithium.

The crystalline resin can possess various melting points of, for example, from about 30° C. to about 120° C., or from about 50° C. to about 90° C. The crystalline resin may have, for example, a number average molecular weight ($M_n$), as measured by gel permeation chromatography (GPC) of from about 1,000 to about 50,000, or from about 2,000 to about 25,000. The weight average molecular weight ($M_w$) of the crystalline polyester resin may be, for example, from about 2,000 to about 100,000, and from about 3,000 to about 80,000, as determined by gel permeation chromatography using polystyrene standards. The molecular weight distribution ($M_w/M_n$) of the crystalline polyester resin is, for example, from about 2 to about 6, and more specifically, from about 2 to about 4.

Examples of organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like. The aliphatic diol is, for example, selected in an amount of from about 45 to about 50 mole percent of the resin, and the alkali sulfo-aliphatic diol can be selected in an amount of from about 1 to about 10 mole percent of the resin.

Examples of organic diacids or diesters selected for the preparation of the crystalline polyester resins include oxalic acid, succinic acid, glutaric acid, adipic acid, suberic acid, azelaic acid, sebacic acid, phthalic acid, isophthalic acid, terephthalic acid, napthalene-2,6-dicarboxylic acid, naphthalene-2,7-dicarboxylic acid, cyclohexane dicarboxylic acid, malonic acid and mesaconic acid, a diester or anhydride thereof; and an alkali sulfo-organic diacid such as the sodio, lithio or potassium salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfoethanediol, 2-sulfopropanediol, 2-sulfobutanediol, 3-sulfopentanediol, 2-sulfohexanediol, 3-sulfo-2-methylpentanediol, 2-sulfo-3,3-dimethylpentanediol, sulfo-p-hydroxybenzoic acid, N,N-bis(2-hydroxyethyl)-2-amino ethane sulfonate, or mixtures thereof. The organic diacid is selected in an amount of, for example, from about 40 to about 50 mole percent of the resin, and the alkali sulfoaliphatic diacid can be selected in an amount of from about 1 to about 10 mole percent of the resin. There can be selected for the third latex branched amorphous resin an alkali sulfonated polyester resin. Examples of suitable alkali sulfonated polyester resins include, but are not limited to, the metal or alkali salts of copoly(ethylene-terephthalate)-copoly-(ethylene-5-sulfo-isophthalate), copoly(propylene-terephthalate)-copoly (propylene-5-sulfo-isophthalate), copoly(diethylene-terephthalate)-copoly(diethylene-5-sulfo-isophthalate), copoly (propylene-diethylene-terephthalate)-copoly(propylene-diethylene-5-sulfo-isophthalate), copoly(propylene-butylene-terephthalate)-copoly(propylene-butylene-5-sulfo-isophthalate), copoly-(propoxylated bisphenol-A-fumarate)-copoly(propoxylated bisphenol-A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly(ethoxylated bisphenol-A-5-sulfo-isophthalate), and wherein the alkali metal is, for example, a sodium, lithium or potassium ion.

Various known colorants, such as pigments, selected for the processes illustrated herein and present in the toner in an effective amount of, for example, from about 1 to about 25 percent by weight of toner, and more specifically, in an amount of from about 3 to about 10 percent by weight include, for example, carbon blacks, cyan, yellow, magenta, red, blue, green, brown, and other colors, and more specifically, carbon black like REGAL 330®; REGAL 660®; phthalocyanine Pigment Blue 15, Pigment Blue 15.1, Pigment Blue 15.3, Pigment Green 7, Pigment Green 36, Pigment Orange 5, Pigment Orange 13, Pigment Orange 16, Pigment Orange 36, Pigment Red 122, Pigment Red 53.1, Pigment Red 48.1, Pigment Red 48.2, Pigment Red 49.1, Pigment Red 49.2, Pigment Red 22, Pigment Red 185, Pigment Red 188, Pigment Red 210, Pigment Red 238, Pigment Red 170, Pigment Red 23, Pigment Red 81.2, Pigment Red 81.3, Pigment Red 57, Pigment Red 17, Pigment Red 169, Pigment Violet 19, Pigment Violet 23, Pigment Violet 3, Pigment Violet 27, Pigment Yellow 65, Pigment Yellow 1, Pigment Yellow 83, Pigment Yellow 17, Pigment Yellow 12, Pigment Yellow 14, Pigment Yellow 97, Pigment Yellow 74, Pigment Yellow 3, Pigment Yellow 75, available from Sun Chemicals, PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ available from Hoechst, and CINQUASIA MAGENTA™ available from E.I. DuPont de Nemours and Company, and the like. Generally, colored pigments that can be selected are cyan, magenta, or yellow pigments, and mixtures thereof. Examples of magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans that may be selected include copper tetra(octadecyl sulfonamido) phthalocyanine, x-copper phthalocyanine pigment identified in the Color Index as CI 74160, CI Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Yellow 180 and Permanent Yellow FGL, wherein the colorant is present, for example, in the amount of about 3 to about 15 weight percent of the toner. Organic dye examples include known suitable dyes, reference the Color Index, and a number of U.S. patents. Organic soluble dye examples, preferably of a high purity, for the purpose of color gamut are NEOPEN YELLOW 075™, NEOPEN YELLOW 159™, NEOPEN ORANGE 252™, NEOPEN RED 336™, NEOPEN RED 335™, NEOPEN RED 366™, NEOPEN BLUE 808™, NEOPEN BLACK X53™, NEOPEN BLACK X55™, wherein the dyes are selected in various suitable amounts, for example from about 0.5 to about 20 percent by weight, and more specifically, from about 5 to about 20 weight percent of the toner. Colorants include pigment, dye, mixtures of pigment and dyes, mixtures of pigments, mixtures of dyes, and the like.

Examples of anionic surfactants include, for example, sodium dodecylsulfate (SDS), sodium dodecylbenzene sulfonate, sodium dodecylnaphthalene sulfate, dialkyl benzenealkyl, sulfates and sulfonates, abitic acid, available from Aldrich, NEOGEN RK™, NEOGEN SC™ available from Kao, mixtures thereof, other suitable known anionic surfactants, and the like. An effective concentration of the anionic surfactant generally employed is, for example, from about 0.01 to about 10 percent by weight, and preferably from about 0.1 to about 5 percent by weight of monomers used to prepare the toner polymer resin.

Examples of nonionic surfactants that may be, for example, included in the resin latex dispersion include, for example, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, available from Rhodia as IGEPAL CA-210®, IGEPAL CA-520®, IGEPAL CA-720®, IGEPAL CO-890®, IGEPAL CO-720®, IGEPAL CO-290®, IGEPAL CA-210®, ANTAROX 890® and ANTAROX 897®, or mixtures thereof, and other known suitable nonionic surfactants. A suitable concentration of the nonionic surfactant is, for example, from about 0.01 to about 10 percent by weight, and more specifically, from about 0.1 to about 5 percent by weight of monomers used to prepare the toner polymer resin.

Examples of cationic surfactants, which are usually positively charged, selected for the toners and processes of the present invention include, for example, alkylbenzyl dimethyl ammonium chloride, dialkyl benzenealkyl ammonium chloride, lauryl trimethyl ammonium chloride, alkylbenzyl methyl ammonium chloride, alkylbenzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof. A suitable amount of this surfactant can be selected, such as from about 0.2 to about 5, or from about 0.5 to about 3 percent by weight of the toner components.

Examples of silicates that can be selected are sodium silicates, such as those commercially available like A®1647, A®1847, A®2445, A®2447, A®2645, BJ™ 120, BW™ 50, C™, D™, E™, K®, M®, N®, N®38, N Clear, O®, OW®, RU™, SS® 22, SS® 75, STAR™, STARSO®, STIXSI™ RR, and V®; potassium silicates, such as KASIL® 1, KASIL® 6, KASIL® 23, all available from Philadelphia Quartz; sodium silicate Cat. #33,844-3 available from Aldrich Chemicals; OXYCHEM GRADE 40, GRADE 42, GRADE JW-25, GRADE 47, GRADE 49F, GRADE 50, GRADE 52, GRADE WD-43, all available from Occidental Chemical Corporation; KS NO1, NO2, NO3, NO4, SC2, SP2, SB3, G3, SS3, all available from ESEL TechTra Inc., South Korea; sodium silicates available from J.T. Baker, and the like. The silicates in embodiments exhibit a mole ratio of $SiO_2$:$Na_2O$ of about 1.5 to about 3.5, and a mole ratio of $SiO_2$:$Na_2O$ of about 1.8 to about 2.5; a particle size of about 5 to about 80 nanometers; a viscosity at about 20° C. as measured by a Brookfield viscometer of from about 20 to about 1,200 centipoises and a density of about 1.25 to about 1.70 gram per $cm^3$.

Examples of complexing compounds in place of the silicates illustrated herein are those that are suitable, such as ethylenediaminetetraacetic acid (ETDA); diethylenetriaminepentacetic acid; nitrilotriacetic acid; or the corresponding salts thereof of the aforementioned, such as the alkali metal salts like sodium, potassium, calcium, and the like, and which complexing compound can be mixed with soap, water, and the like. Also, in embodiments biodegradable compounds of the complexing compounds illustrated can also be selected, such as gluconal, sodium gluconate, potassium and sodium citrate, nitrotriacetate (NTA) salt, GLDA (commercially available L-glutamic acid N,N diacetic acid) humic and fulvic acids, maltol and ethyl-maltol, peta-acetic and tetra-acetic acids; the corresponding salts of the aforementioned, such as the alkali metal salts, like sodium, potassium, calcium, and the like

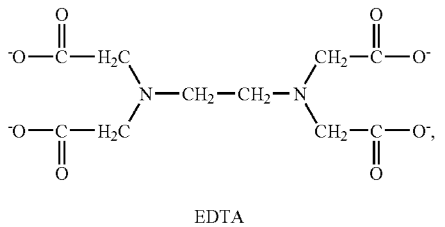

EDTA

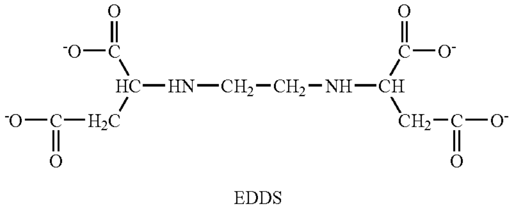

and

EDDS

-continued

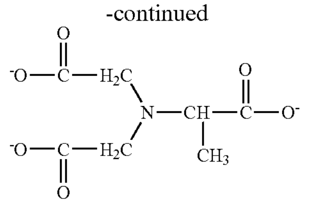

MGDA

The coagulant is in embodiments present in an aqueous medium in an amount of from, for example, about 0.05 to about 10 percent by weight, and more specifically, in an amount of from about 0.075 to about 2 percent by weight. The coagulant may also contain minor amounts of other components, for example nitric acid. The coagulant is usually added slowly into the blend of latex or latexes, colorant, wax, and other suitable known components while continuously subjecting the blend to high shear, for example, by stirring with a blade at about 3,000 to about 10,000 rpm, and more specifically, about 5,000 rpm for about 1 to about 120 minutes. A high shearing device, for example an intense homogenization device, such as the in-line IKA SD-41, may be used to permit a blend that is homogeneous and uniformly dispersed.

Counterionic coagulants may be comprised of organic or inorganic entities, and the like. For example, in embodiments the ionic surfactant of the resin latex dispersion can be an anionic surfactant, and the counterionic coagulant can be a polymetal halide or a polymetal sulfo silicate (PASS). Coagulants that can be included in amounts of, for example, from about 0.05 to about 10 weight percent are polymetal halides, polymetal sulfosilicates, monovalent, divalent or multivalent salts optionally in combination with cationic surfactants selected in an amount, for example, of about 0.1 to about 5 weight percent, and the like. Inorganic cationic coagulants include, for example, polyaluminum chloride (PAC), polyaluminum sulfo silicate (PASS), aluminum sulfate, zinc sulfate, or magnesium sulfate.

Examples of waxes include those as illustrated herein, such as those of the aforementioned copending applications, polypropylenes and polyethylenes or mixtures thereof commercially available from Allied Chemical and Petrolite Corporation, wax emulsions available from Michaelman Inc. and the Daniels Products Company, EPOLENE N-15™ commercially available from Eastman Chemical Products, Inc., VISCOL 550-P™, a low weight average molecular weight polypropylenes available from Sanyo Kasei K.K., and similar materials. The commercially available polyethylenes selected possess, it is believed, a molecular weight $M_w$ of from about 1,000 to about 3,500, while the commercially available polypropylenes utilized for the toner compositions of the present invention are believed to have a molecular weight of from about 4,000 to about 8,000. Examples of functionalized waxes include amines, amides, for example AQUA SUPERSLIP 6550™, SUPERSLIP 6530™ available from Micro Powder Inc.; fluorinated waxes, for example POLYFLUO 190™, POLYFLUO 200™, POLYFLUO 523XF™, AQUA POLYFLUO 411™, AQUA POLYSILK 19™, POLYSILK 14™ available from Micro Powder Inc.; mixed fluorinated, amide waxes, for example MICROSPERSION 19™ also available from Micro Powder Inc.; imides, esters, quaternary amines, carboxylic acids or acrylic polymer emulsion, for example JONCRYL 74™, 89™, 130™, 537™, and 538™, all available from SC Johnson Wax; chlorinated polypropylenes and polyethylenes available from Allied Chemical and Petrolite Corporation and SC Johnson Wax; and mixtures thereof.

The solids content of the substantially or polyester free and crystalline polyester resin latexes dispersion are not particularly limited, thus the solids content may be from, for example, about 10 to about 90 percent or from about 25 to about 55 percent by weight. With further regard to the colorants, in some instances they are available in the wet cake or concentrated form containing water, and can be easily dispersed utilizing a homogenizer or simply by stirring or ball milling, attrition, or media milling. In other instances, pigments are available only in a dry form whereby dispersion in water is effected by microfluidizing using, for example, a M-110 microfluidizer or an ultimizer, and passing the pigment dispersion from about 1 to about 10 times through a chamber by sonication, such as using a Branson 700 sonicator, with a homogenizer, ball milling, attrition, or media milling with the optional addition of dispersing agents such as the aforementioned ionic or nonionic surfactants.

During the coalescence, the pH can be increased, for example, from about 2 to about 3 to about 7 to about 8, by the addition of a suitable pH increasing agent of, for example, sodium silicate dissolved in an alkali metal hydroxide, such as sodium hydroxide, to provide for stabilization of aggregate particles and to prevent/minimize toners size growth and loss of GSD during further heating, for example, raising the temperature about 10° C. to about 50° C. above the resin Tg; and also the silicate acts as a sequestering agent substantially avoiding aluminum ionomeric crosslinking of the resin. Examples of pH reducing agents include, for example, nitric acid, citric acid, sulfuric acid or hydrochloric acid, and the like.

The toner particles illustrated herein may also include known charge additives in effective amounts of, for example, from about 0.1 to about 5 weight percent, such as alkyl pyridinium halides, bisulfates, the charge control additives of U.S. Pat. Nos. 3,944,493; 4,007,293; 4,079,014; 4,394,430 and 4,560,635, the disclosures of which are totally incorporated herein by reference, and the like. Surface additives that can be added to the toner compositions after washing or drying include, for example, metal salts, metal salts of fatty acids, colloidal silicas, metal oxides, mixtures thereof, and the like, which additives are usually present in an amount of from about 0.1 to about 2 weight percent, reference U.S. Pat. Nos. 3,590,000; 3,720,617; 3,655,374 and 3,983,045, the disclosures of which are totally incorporated herein by reference. Specific additives or mixtures thereof include zinc stearate and AEROSIL R972® available from Degussa Chemical and present in an amount of from about 0.1 to about 2 percent which can be added during the aggregation process or blended into the formed toner product.

Developer compositions can be prepared by mixing the toners obtained with the process of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration.

The following Examples are provided. Parts and percentages are by weight unless otherwise indicated and temperatures are in degrees Centigrade.

EXAMPLES

Preparation of Latex A (Sty/Ba/Beta CEA):

A latex emulsion (i) comprised of polymer particles generated from the emulsion polymerization of styrene, butyl acrylate (Ba) and beta carboxy ethyl acrylate (Beta CEA) was prepared as follows. A surfactant solution of 434 grams of DOWFAX 2A1™ (anionic emulsifier with 55 percent active ingredients) and 387 kilograms of deionized water was prepared by mixing these components for 10 minutes in a stainless steel holding tank. The holding tank was then purged with nitrogen for 5 minutes before transferring the mixture into a reactor. The reactor was then continuously purged with nitrogen while being stirred at 100 RPM. The reactor was then heated to 80° C.

Separately, 6.11 kilograms of ammonium persulfate initiator were dissolved in 30.2 kilograms of deionized water. Also, separately a monomer emulsion A was prepared in the following manner. 315.7 Kilograms of styrene, 91.66 kilograms of butyl acrylate, 12.21 kilograms of beta-CEA, 7.3 kilograms of 1-dodecanethiol, 1.42 kilograms of decanediol diacrylate (ADOD), 8.24 kilograms of DOWFAX™ (anionic surfactant), and 193 kilograms of deionized water were mixed to form an emulsion. Five percent of this emulsion was then slowly fed into the reactor containing the above aqueous surfactant phase at 80° C. to form seeds wherein “seeds” refer, for example, to the initial emulsion latex added to the reactor prior to the addition of the initiator solution, while being purged with nitrogen. The above initiator solution was then slowly charged into the reactor forming about 5 to about 12 nanometers of latex “seed” particles. After 10 minutes, the remainder of the emulsion was continuously fed in using metering pumps.

After the above monomer emulsion was charged into the main reactor, the temperature was maintained at 80° C. for an additional 2 hours to complete the reaction. The reactor contents were then cooled down to about 25° C. The resulting isolated product was comprised of 40 weight percent of about 0.2 micron diameter resin particles of styrene/butylacrylate/beta CEA suspended in an aqueous phase containing the above surfactant. The molecular properties resulting for the resin latex were $M_w$ (weight average molecular weight) of 35,000, $M_n$ of 10.6, as measured by a Gel Permeation Chromatograph, and a midpoint Tg of 55.8° C., as measured by a Differential Scanning Calorimeter, where the midpoint Tg is the halfway point between the onset and the offset Tg of the polymer.

Preparation of Latex B (CPE)—Melting Point=80° C.:

A crystalline resin, copoly(ethylene-sebacate)-copoly(ethylene-5-sulfoisophthalate) sodium salt, was prepared from sodio-5-sulfoisophthalic acid, sebacic acid and ethylene glycol as follows.

A 1 liter Parr reactor equipped with a mechanical stirrer distillation apparatus and a bottom drain value was charged with 285 grams of sebacic acid, 208 grams of ethylene glycol, 30.6 grams of sodio 5-sulfo-isophthalic acid, and 0.4 gram of stannoic acid catalyst available as FASCAT™ from Elf-Atochem. The reactor was heated to 150° C. over a 1 hour period at an agitation rate of 100 rpm. The reaction temperature was then raised to 165° C. over a 1 hour period, during which the water byproduct started to collect in the distillation receiver. The reaction temperature was then increased to 185° C. over a 2 hour period, after which the pressure of the reaction was reduced to 0.1 mm-Hg over a 30 minute period. The reaction temperature was then raised to 200° C. for an additional 2 hours, and then the pressure was returned to atmospheric conditions, and the product discharged through the bottom drain valve. The crystalline resin copoly(ethylene-sebacate)-copoly(ethylene-5-sulfoisophthalate) sodium salt, and was found to display a melting point (by DSC) of 80° C.

150 Grams of the above resin were then dissolved in 1 liter of acetone and the mixture resulting was added dropwise over a 5 hour period to a 4 liter kettle containing 2 liters of water at 80° C. The acetone solvent was removed by distillation to yield an emulsion with a resin particle size of 100 nanometers as measured on the Nicomp.

Preparation of CPE—Melting Point=70° C. and Latex C Preparations:

A crystalline polyester resin comprised of 50 percent of 1,9-nonanediol, 45.25 percent of dodecanedioic acid, 3.75 percent of 5-t-butylidophthlic acid, and 1 percent of sodium-5-sulfo-dimethylisophthlate was prepared by a polycondensation reaction. At the end of the reaction the resin terpoly-(nonylene-dodecanoate)-terpoly-(nonylene-5-sulfoisophthalate-terpoly-nonylene-2 butylisophthalate was formed and isolated, and which resin had a melting temperature of 70° C. and a molecular weight $M_w$ of 5,000 as measured by a Waters GPC. The resin was subjected to high shear and a temperature of about 130° C. at a pH of about 10 using cavitron equipment. The resin latex particle size was about 200 nanometers as measured by the Nicomp device.

Preparation of Latex D, CPE Using a Gaulin Homogenizer:

A crystalline polyester resin comprised of 49 percent of sebacic acid, 49 percent of ethylene glycol, and 2 percent (weight percent throughout) of 5-lithium-sulfoisophthalic acid was prepared by a polycondensation reaction in a 2 liter stainless steel reactor. There resulted the resin copoly(ethylene-sebacate-copoly(ethylene-5-sulfoisophthalate) resin, which has a melting point of 68° C. as measured by DSC, and a $M_w$ weight average molecular weight of 12,800 as measured by a Waters GPC. The molten resin was pre-emulsified by cooling the resin in the reactor from about 210° C. to about 90° C., and adding deionized water, which was preheated to 90° C., to the reactor to lower the resin solids content from about 100 percent solids to about 40 percent solids. The reactor mixture was stirred for about 3 hours before cooling to room temperature, about 25° C., and discharging the resulting pre-emulsified polyester latex into a product container. About 950 grams of the polyester latex and about 10 grams of NEOGEN R-K™ anionic surfactant were added to about 2,840 grams of deionized water in a 1 gallon reactor and stirred at about 400 revolutions per minute. The reactor mixture was heated to about 90° C. to remelt the resin. The aqueous mixture containing the molten resin was then subjected to high shear by pumping through a Gaulin 15MR piston homogenizer at about 1 liter per minute for a period of about 30 minutes with the primary homogenizing valve full open, and the secondary homogenizing valve partially closed such that the homogenizing pressure is about 1,000 pounds per square inch. Then the primary homogenizing valve was partially closed such that the homogenizing pressure increases to about 8,000 pounds per square inch. The reactor mixture was retained at about 90° C. and circulated through the homogenizer at about 1 liter per minute for about 45 minutes. Thereafter, the homogenizer was rendered inoperative and the reactor mixture was cooled to room temperature at about 15° C. per minute and discharged into a product container. The resulting aqueous crystalline polyester emulsion was comprised of about 10.3 percent of the polyester resin of copoly(ethylene-sebacate-copoly(ethylene-5-sulfoisophthalate) and about 0.3 percent by weight of surfactant, and had a volume average diameter of about 1,135 nanometers as measured with a Honeywell MICROTRAC® UPA150 particle size analyzer.

Wax and Pigment Dispersions:

The aqueous wax dispersion utilized in the following Examples was generated using waxes available from Baker-Petrolite; (1) P725 polyethylene wax with a low molecular weight $M_w$ of 725, and a melting point of 104° C., or (2) P850 wax with a low molecular weight of 850 and a melting point of 107° C., and NEOGEN RK™ as an anionic surfactant/dispersant. The wax particle diameter size was determined to be approximately 200 nanometers, and the wax slurry was a solid loading of 30 percent (weight percent throughout).

Example I

Emulsion/Aggregation Hybrid Toner With 70 Percent Vinyl Polymer Latex (A) and 10 Percent CPE Latex (B) of Copoly (ethylene-sebacate)-Copoly(ethylene-5-sulfoisophthalate) Sodium Salt, Resin (mp=80° C.); 16 Percent Vinyl Polymer Shell:

345 Grams of Latex (A) having a solids loading of 41.7 weight percent and 427 grams of CPE Latex (Latex B, mp=80° C.) having a solids loading of 4.7 weight percent were added to 400 grams of deionized water in a vessel and stirred using an IKA ULTRA TURRAX® T50 homogenizer operating at 4,000 rpm. Thereafter, 48 grams of the cyan pigment dispersion Sun WA 1929 (PB15:3) having a solids loading of 17 weight percent was added followed by the dropwise addition of 24 grams of a flocculent mixture containing 2.4 grams of a polyaluminum chloride mixture and 21.6 grams of a 0.02 molar nitric acid solution. As the flocculent mixture was added dropwise, the homogenizer stirring speed was increased to 5,200 rpm and homogenized for an additional 5 minutes. Thereafter, the mixture was heated at 1° C. per minute to a temperature of 52° C. and held there for a period of 75 minutes resulting in particles with a volume average particle diameter of 6.1 microns as measured with a Coulter Counter. During the heating period, the stirrer was operated at about 400 rpm. An additional 80 grams of Latex A were added to the reactor mixture to provide a shell/coating on the aggregates, followed by stirring for an additional period of about 60 minutes at 52° C. resulting in a volume average particle diameter of about 7.3 microns. 10 Grams of sodium silicate in 14 percent of a NaOH solution having a solids loading of 27 percent were added to the mixture with additional sodium hydroxide until the pH was increased to 6.8, which freezes the particle size and acts as an aluminum-sequestering agent. The reactor mixture was gently stirred at 93° C. The particle size as measured on the Coulter Counter was 7.7 μm with a GSD of 1.18. The pH was reduced to 4.5 with 4 percent nitric acid, and allowed to heat for a total of 90 minutes resulting in smooth spherical particles as determined by an optical microscope. The particles were washed 6 times, where the first wash was conducted at pH of 10 at 60° C., followed by 3 washes with deionized water at room temperature, one wash at a pH of 4 at 40° C., and the last wash with deionized water at room temperature. The charging of these resulint toner particles with a carrier comprised of an iron core with a coating of 1 percent of polymethyl methacrylate resulted in a charge of −32 μ/C (C zone) and −21 μ/C in (B zone). The toner resulting was comprised of 86 percent of vinyl polymer, 10 percent of crystalline polyester, and 4 percent pigment by weight of toner, and wherein the shell was buried in or entrapped by the vinyl polymer. A DSC scan evidences the presence (81° C.) of the CPE resin.

Example II

A Hybrid Toner with 48 Percent Vinyl Polymer Latex (A) and 20 Percent CPE (B) Resin (mp=80° C.), 28 Percent Vinyl Polymer Shell:

238 Grams of Latex A having a solids loading of 41.7 weight percent and 854 grams of JN 21 CPE latex (Latex B, mp=80° C.) having a solids loading of 4.7 weight percent were added to 300 grams of deionized water in a vessel and stirred using an IKA ULTRA TURRAX® T50 homogenizer operating at 4,000 rpm. Thereafter, 48 grams of the cyan pigment dispersion Sun WA 1929 (PB15:3) having a solids loading of 17 weight percent was added followed by the dropwise addition of 30 grams of a flocculent mixture containing 3 grams of a polyaluminum chloride coagulant mixture and 27 grams of a 0.02 molar nitric acid solution. As the flocculent mixture was added dropwise, the homogenizer speed was increased to 5,200 rpm and homogenized for an additional 5 minutes. Thereafter, the mixture resulting was heated at 1° C. per minute to a temperature of 50° C. and held there for a period of 80 minutes resulting in a volume average particle diameter of 6.3 microns as measured with a Coulter Counter. Thereafter, there were added an additional 138 grams of EP 5 latex added to the reactor mixture to provide a shell/coating on the aggregates, followed by stirring for an additional period of about 60 minutes at 50° C. resulting in a volume average particle diameter of about 7.3 microns. 10 Grams of sodium silicate in a 14 percent NaOH solution having a solids loading of 27 percent were added to the mixture with additional sodium hydroxide until the pH was increased to 6.8, which freezes the particle size and acts as an aluminum-sequestering agent. The reactor mixture was gently stirred at 90° C. The particle size of the solids as measured on the Coulter Counter was 7.9 μm with a GSD of 1.19. The pH was reduced to 4.6 with a 4 percent nitric acid, and the mixture was heated for a total of 180 minutes resulting in smooth spherical toner particles. The particle size was 8.2 μm with a GSD of 1.25. The particles were washed 6 times, where the first wash was conducted at a pH of 10 at 60° C., followed by 3 washes with deionized water at room temperature, one wash at a pH of 4 at 40° C., and a final wash with deionized water at room temperature. The charging of these particles on a carrier comprised of an iron core with a coating of 1 percent polymethyl methacrylate resulted in a charge of −51 μ/C (C zone) and −23 μ/C (B zone). The DSC scan of this toner was very similar to the scan of the toner of Example I showing the presence (81° C.) of CPE resin. The toner resulting was comprised of 76 percent of the above vinyl polymer, 20 percent of the above crystalline polyester, and 4 percent of the above pigment, and wherein the above vinyl polymer shell was entrapped.

Example III

A hybrid toner with 70 percent vinyl polymer (A) and 10 percent CPE latex (D) resin (MP=66° C.), and 16 percent vinyl polymer shell was prepared substantially in accordance with the process of Example I. The resulting toner had a particle size of 7.1 μm with a GSD of 1.25. A DSC scan indicated the presence of the CPE at 68° C. The toner was comprised of 86 percent vinyl polymer, 10 percent crystalline polyester, 4 percent pigment, and a shell as illustrated herein.

Example IV

Latex (A) and Latex (C):

To 407 grams of deionized water was added a core latex (118 grams of 42 percent solids Latex (A) +240.6 grams of Latex (C) having a solids of 20 percent), 71.04 grams of 30 percent solids P850 wax, 56.1 grams of the above 17 percent solids cyan pigment followed by homogenization for 10 minutes. To the resulting homogenized latex/wax/pigment blend, 31.5 grams of a PAC/nitric acid solution (PAC=polyaluminum chloride coagulant) containing 3.15 grams of PAC with 10 percent active ingredients and 28.35 grams of 0.02M nitric acid were added to the above mixture to initiate a flocculation. After the addition was completed, homogenization was continued for an additional 5 minutes. The resulting blend was transferred to a reactor and stirred at 200 rpm while heated to 54° C. Particle growth was monitored during heating. When a toner particle size of 5.5 microns was achieved, 120 grams of Latex (A) were added over 10 minutes to provide a shell. The mixture was allowed to stir and the toner particle size was measured from time to time. When a particle size of 6 microns was achieved, the pH of the slurry was adjusted from 2.6 to 4.5 by the addition of a 4 percent NaOH solution followed by the addition of 5.08 grams of a EDTA solution having a solids loading of 39 percent. After 15 minutes of stirring, the reactor temperature was raised to 95° C. After 10 minutes into the 95° C. heating sequence, the pH of the slurry was reduced from a pH of 6 to a pH of 3.9. The mixture resulting was allowed to stir for an additional period of 90 minutes. The reactor was then cooled and the mixture was discharged. The final toner particle size was 5.8 microns with GSD=1.20, with a smooth potato type morphology (as observed under an optical microscope) and a solids content of 17 percent. The particles were washed in the following manner. The first wash was conducted at a pH of 10 at 53° C. for 20 minutes and washed two times in DIW at room temperature for 40 minutes. This was followed by a pH 4 treatment at 40° C. for 40 minutes followed by a deionized water wash before drying. The toner resulting was comprised of 55.5 percent of the above vinyl polymer, 27.5 percent of the above CPE resin, 5 percent of the above pigment and 12 percent polyethylene wax by weight of toner with a shell of Latex resin A.

This toner was prepared in accordance with the process of Example I except that only Latex (A), which was comprised of poly(styrene-butylacrylate, beta carboxy ethylacrylate), was used to prepare the toner. The cyan toner resulting had a particle size of 7.9 μm with a GSD of 1.21.

When the above Example noncomparative toners were fused, an about 15° C. to about 30° C. reduction in the minimum fixing temperature resulted, while the minimum fixing temperature of the above Comparative toner was 190° C., which temperatures were determined on a Xerox Corporation iGen machine fuser.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A process comprising heating a mixture of colorant dispersion, a first resin latex, a second crystalline resin latex, and a coagulant, and wherein said heating involves a first heating, followed by the addition of a third latex containing a vinyl polymer enabling the formation of a shell, and subsequently accomplishing a second heating, and which second heating is at a higher temperature than said first heating, and wherein said second heating is above about the glass transition temperature of said first latex, and said second heating is accomplished in the presence of a sequestering compound, and wherein the first resin latex and second resin latex are free of a polyester, and the second latex resin is a crystalline polyester.

2. A process in accordance with claim 1 wherein said first latex polymer possesses a molecular weight $M_w$ of about 20,000 to about 500,000, and an onset glass transition (Tg) temperature of from about 45° C. to about 55° C.

3. A process in accordance with claim 1 wherein said latex first resin is selected in an amount of from about 65 to about 85 weight percent, further adding a wax selected in an amount of from about 5 to about 15 weight percent, and wherein said colorant is selected in the amount of about 3 to about 15 percent, and wherein the total thereof of said components is about 100 percent based on said toner.

4. A process in accordance with claim 1 wherein the sequestering component is a silicate salt which extracts from about 50 to about 98 percent of ions of Al, Ca, Mn, Mg, Zn, Ni or mixtures thereof.

5. A process in accordance with claim 1 wherein said first resin latex and said second resin latex are free of crosslinking.

6. A process comprising heating a mixture of colorant, a first polyester free latex, and a second crystalline polyester latex in the presence of a coagulant, and wherein said heating comprises a first heating equal to or below about the glass transition temperature of a first polymer contained in said first latex, followed by the addition of a third latex free of a polyester enabling the formation of a shell and a second heating equal to or above the glass transition temperature of a first polymer contained in said first latex wherein said first heating enabling the formation of aggregates, and said second heating enabling the fusion of said aggregates; and optionally wherein there is added prior to fusion a sequestering component.

7. A process in accordance with claim 6 wherein said sequestering component is a silicate salt.

8. A process in accordance with claim 6 wherein said sequestering component is an organic component.

9. A process in accordance with claim 8 wherein said organic component is ethylenediaminetetraacetic acid.

10. A process in accordance with claim 8 wherein said organic component is nitrilotriacetic acid; gluconal, sodium gluconate, potassium and sodium citrate, nitrotriacetate (NTA) salt, L-glutamic acid N,N diacetic acid humic acid, fulvic acid, maltol, ethyl-maltol, peta-acetic or tetra-acetic acid.

11. A process in accordance with claim 8 wherein said shell is generated from said third latex containing a vinyl polymer.

12. A process in accordance with claim 6 wherein there is formed one latex comprised of said first and said second latex, and wherein each of said latexes contain an uncrosslinked resin.

13. A process in accordance with claim 6 wherein said colorant is a pigment of cyan, magenta, yellow, black or mixtures thereof.

14. A toner obtained by the process of claim 6.

15. A process in accordance with claim 6 wherein said third latex polymer is a styrene containing polymer, and wherein there is generated a shell from said polymer.

16. A process in accordance with claim 6 wherein said vinyl polymer is generated from the emulsion polymerization of styrene, butylacrylate, and beta carboxyethyl acrylate, optionally wherein said polyester is a sulfonated polyester, and wherein said vinyl polymer is a styrene containing polymer.

* * * * *